United States Patent
Nagai et al.

(10) Patent No.: US 10,558,190 B2
(45) Date of Patent: Feb. 11, 2020

(54) MULTI-MODE-CONTROL APPARATUS FOR INNER PRESSURE OF VACUUM CHAMBER AND MULTI-MODE-CONTROL METHOD FOR INNER PRESSURE OF VACUUM CHAMBER

(71) Applicant: V-TEX CORPORATION, Tokyo (JP)

(72) Inventors: Hideaki Nagai, Mito (JP); Takayuki Tadokoro, Hitachinaka (JP); Akira Iwamoto, Hitachinaka (JP)

(73) Assignee: V-TEX CORPORATION, Tokyo (JP)

( * ) Notice: Subject to any disclaimer, the term of this patent is extended or adjusted under 35 U.S.C. 154(b) by 136 days.

(21) Appl. No.: 15/759,597

(22) PCT Filed: Apr. 20, 2017

(86) PCT No.: PCT/JP2017/015864
§ 371 (c)(1),
(2) Date: Mar. 13, 2018

(87) PCT Pub. No.: WO2018/193573
PCT Pub. Date: Oct. 25, 2018

(65) Prior Publication Data
US 2019/0072989 A1 Mar. 7, 2019

(51) Int. Cl.
G05B 19/05 (2006.01)

(52) U.S. Cl.
CPC .... *G05B 19/054* (2013.01); *G05B 2219/1215* (2013.01)

(58) Field of Classification Search
CPC .......... G05B 19/054; G05B 2219/1215; G05D 16/00; G05D 16/2026; G05D 16/2066; H01L 21/67017; H01L 21/67253
See application file for complete search history.

(56) References Cited

U.S. PATENT DOCUMENTS

| 6,522,935 | B1 | 2/2003 | Imaizumi |
| 7,706,925 | B2 * | 4/2010 | Ding .................. G05D 16/2046 700/281 |

(Continued)

FOREIGN PATENT DOCUMENTS

| JP | 9-16211 A | 1/1997 |
| JP | 3301042 B2 | 4/2002 |

(Continued)

OTHER PUBLICATIONS

International Search Report from International Application No. PCT/JP2017/015864 dated May 9, 2017.

*Primary Examiner* — Eric Keasel
(74) *Attorney, Agent, or Firm* — Daniel J. Stanger

(57) ABSTRACT

{Problem}
In combining the master valve and the groups of slave valves, the configuration of the combination is made not for performing simply a uniform control, but is made to be such a form as capable of corresponding to the size and the inside configuration of the processing apparatus, or customer's requirements, which thereby allows a prompt adaptation to variety of demands.
{Solution to Problem}
In combining the master controller and the slave controller, the operation mode is set, and it is made possible to transmit the generated valve opening degree common signal and the generated valve opening degree individual signal from the master controller, corresponding to the operation mode, to the slave controllers that are connected in the sequential daisy-chain style, thereby the slave valves are opening-degree-controlled by any of such generated valve opening degree signals.

3 Claims, 6 Drawing Sheets

(56) References Cited

U.S. PATENT DOCUMENTS

| | | | |
|---|---|---|---|
| 8,623,457 B2 * | 1/2014 | Ashizawa | H01L 21/67196 |
| | | | 118/683 |
| 2007/0235668 A1 | 10/2007 | Goldman et al. | |
| 2011/0174380 A1 | 7/2011 | Itafuji | |
| 2011/0208362 A1 | 8/2011 | Alstrin et al. | |
| 2015/0039099 A1 | 2/2015 | Mizutani | |

FOREIGN PATENT DOCUMENTS

| | | |
|---|---|---|
| JP | 2011-248916 A | 12/2011 |
| JP | 5123286 B2 | 11/2012 |
| JP | 2013-527511 A | 6/2013 |
| JP | 5322254 B2 | 7/2013 |
| JP | 6051547 B2 | 12/2016 |
| WO | 2007/126543 A2 | 11/2007 |

* cited by examiner

FIG. 6

| PLC Operation mode of generation | | Master controller Function selection | Slave controller function selection | |
|---|---|---|---|---|
| | | | Slave A | Slave B |
| e. g. -1 | · Pressure control signal transmission · Control valve controlling | →○→ →○→ | →○→ →○→ | →○→ →○→ |
| e. g. -2 | · Pressure control signal transmission · Control valve controlling | →○→ →○→ | →○→ →○→ | →○→ →○→ |
| e. g. -3 | · Pressure control signal transmission · Control valve controlling | →○→ →○→ | →○→ →○→ | →○→ |
| e. g. -4 | · Pressure control signal transmission · Control valve controlling | →○→ ×××○ | →○→ ××××○ | →○→ ××××○ ××× |

(Follow-transmission by simplex communication)

MULTI-MODE-CONTROL APPARATUS FOR INNER PRESSURE OF VACUUM CHAMBER AND MULTI-MODE-CONTROL METHOD FOR INNER PRESSURE OF VACUUM CHAMBER

TECHNICAL FIELD

The present invention relates to a multi-mode-control apparatus for inner pressure of a vacuum chamber and a multi-mode-control method for inner pressure of a vacuum chamber.

BACKGROUND ART

In the process of manufacturing a panel display substrate such as a liquid crystal (LCD) substrate, predetermined vacuum processing, such as etching processing or film forming processing, is performed on the object under reduced pressure. As the size of the panel display substrate increases, the manufacturing apparatus is also large-sized, and is required to have a large exhaust capacity while supplying a processing gas at a large flow rate to a vacuum chamber, i.e., a process chamber. For this reason, one process chamber becomes to have many exhaust paths. If the capacity of the processing container is large, controlling the pressure by one control valve causes uneven distribution of pressure inside the process chamber. Because of this, it has been attempted to equalize the pressure in the process chamber by providing a number of exhaust paths.

Patent literature 1 describes a vacuum processing apparatus, in which n number of exhaust paths are connected to one process chamber, each of exhaust paths has individually an evacuation means, and the conductance of each exhaust paths is controlled with one controller.

Patent literature 2 describes a control system. In the system, discharge paths are provided and each discharge path has fluid controllers and a pressure detection means. The fluid controllers are controlled, by the pressure detected with the pressure detection means, in any one of manners collectively and individually and by group.

Patent literature 3 describes a system in which a master valve and a group of slave valves are coupled through a digital network.

Patent literature 4 describes a downlink for transmitting data from a master control unit to slave control units and an uplink for transmitting data from slave control units to the master control unit.

LITERATURE OF CONVENTIONAL ART

Patent Literature

{Patent Literature 1} Japanese patent 5322254
{Patent Literature 2} Japanese patent 3301042
{Patent Literature 3} Japanese patent 5123286
{Patent Literature 4} Japanese patent 6051547

SUMMARY OF INVENTION

Technical Problem

As the patent literatures listed above show; it is known that a plurality of exhaust paths are connected to a large-capacity process chamber, the pressure of the exhaust path is detected, and each controller controls the control valve in a multi-mode manner; it is also known to couple a master valve and grouped slave valves through a digital network; it is further known that a downlink technique for transmitting data from the master control unit to the slave control units and an uplink technique for transmitting data from the slave control units to the master control unit.

According to these techniques, each control unit can control the control valves in a multi-mode manner, and combining the master valve with the grouped slave valves eliminates, without providing the pressure detector on every exhaust path, needs of individually producing control signals on the basis of the detected pressure; thus, the way of control was simplified.

The multi-mode-control apparatus for inner pressure of a vacuum chamber or the multi-mode-control method for inner pressure of a vacuum chamber by the present invention handles not many control objects but controls the pressure of single object inside the process chamber. In combining the master valve with the groups of slave valves, the style of the combination should not to be a fixed combination for a uniform control over them; the style is required to be versatile configuration with flexibility in the size or the inside configuration of the processing apparatus, or customer's requirements so that it can respond promptly to the requirements in variety.

Such circumstance has desired an apparatus having configuration suitable for a multi-mode-control for inner pressure of a vacuum chamber or a suitable method for a multi-mode-control for inner pressure of a vacuum chamber. The desired apparatus having suitable configuration or the suitable method means a system that does not require interposing working of a network or other controlling device between the operation of the master valve and the operation of slave valves, and further means that the communication line therein is simplified one and the relationship between the master valve and slave valves thereof are fully utilized.

In view of such points, an object of the present invention is to provide a configuration suitable for a multi-mode-control apparatus for controlling inner pressure of a vacuum chamber or suitable for a multi-mode-control method for inner pressure of a vacuum chamber. The invented configuration does not require interposing a network or other controller between the combination of the controller for controlling the master valve and the controller for the grouped controllers for the slave valves, and the configuration utilizes the relationship between the master device and the slave devices by simplifying the communication line. Further, the combination of the master valve and the group of slave valves is configured not for performing a unified control but to respond to the demand on the size and the inside configuration of the processing apparatus, or customer's requirements, allowing a prompt adaptation to variety of demands.

Means for Solving Problems

The present invention relates to a multi-mode-control apparatus for inner pressure of a process chamber or to a multi-mode-control method for inner pressure of a vacuum chamber,
wherein
the process chamber has n number of exhaust paths to vacuum inside thereof (where n is an integer of two or larger), one end of each of the exhaust paths is connected to the process chamber in which an object of processing is to be vacuum treated, control valves are provided individually on the other end of each of the n number of exhaust paths, and a controller is provided to control the control valves installed on the exhaust paths;
wherein
the multi-mode-control apparatus controls, in multiple modes, the conductance of the exhaust path of the process chamber that has a pressure detection means for detecting the inner pressure of the process chamber.

The present invention provides a multi-mode-control apparatus for inner pressure of a process chamber in which an object of processing is vacuum treated,
wherein
the process chamber has n number of exhaust paths (where n is an integer of two or larger), one end of each of which is connected to the process chamber to vacuum the inside thereof, a control valve is provided individually on the other end of every exhaust paths of n number;
wherein
a controller is provided to control the control valve, a pressure detection means is provided to detect the inner pressure of the process chamber, the conductance of the exhaust paths connected to the process chamber is controlled in a multiple control manner;
wherein
the multi-mode-control apparatus for inner pressure of the process chamber is characterized in that each one controller provided on every exhaust path has the same form in terms of the function for transmission of the valve opening degree signal and the control function of the control valves, the controllers are connected in a sequential daisy-chain style, an individual identification code for identifying each controller and a group identification code for identifying each group are assigned to each of the exhaust paths of n number, each of which severally has one controller, an arbitrary controller functions as a master controller that generates the pressure control signal for the process chamber on the basis of a pressure value detected by the pressure detection means, the other controllers function as slave controllers which receive, via the sequential daisy-chain connection, the pressure control signal or the valve opening degree signal equivalent thereto (hereinafter referred to as valve opening degree signal) generated by the master controller, a communication line is formed from the master controller down to the slave controller located on the end;
  in the mode in which the all-group-identification code assigned in grouping the n number of exhaust paths each severally having one controller are selected, all the slave controllers are controlled by the generated valve opening degree signal transmitted from the master controller via the sequential daisy-chain connection,
  in the mode in which the group identification code assigned in grouping the n number of exhaust paths each severally having one controller is selected, the slave controller in the selected group is controlled by the valve opening degree signal generated by and transmitted from the master controller via the sequential daisy-chain connection, and the slave controllers in the group other than the selected group are individually controlled by respectively generated valve opening degree individual signals transmitted from the master controller via the sequential daisy-chain connections,
  in the mode in which the individual identification code assigned in grouping is selected, every slave controller is individually controlled by the valve opening degree individual signals respectively generated by and transmitted from the master controller via the sequential daisy-chain connection.

The present invention provides a multi-mode-control apparatus for inner pressure of a process chamber in which an object of processing is vacuum treated,
wherein
the process chamber has n number of exhaust paths (where n is an integer of two or larger), one end of each of which is connected to the process chamber to vacuum the inside thereof, a control valve is provided individually on the other end of every exhaust paths of n number, a controller is provided to control the control valve, and a pressure detection means is provided to detect the inner pressure of the process chamber, the conductance of the exhaust paths connected to the process chamber is controlled in a multiple control manner;
wherein
the multi-mode-control apparatus for inner pressure of a process chamber is characterized in that each controller provided on every exhaust path has the same form in terms of the valve opening degree signal transmission function and the controlling function of the control valves, an arbitrary controller functions as a master controller that generates the pressure control signal for the process chamber on the basis of a pressure value detected by the pressure detection means, the other controllers function as slave controllers which receives, via the sequential daisy-chain connection, the valve opening signal generated by the master controller, a communication line is formed from the master controller down to the slave controller located on the end, the master controller generates the valve opening degree common signal that is to be transmitted commonly to controllers of all the slaves or to the grouped controllers and generates the valve opening degree signal to be transmitted individually to controllers of all the salve controllers or to the grouped controllers, and the slave controller is controlled by a valve opening degree signal comprising either the generated valve opening degree common signal or the generated valve opening degree individual signal.

The present invention provides a multi-mode-control method for inner pressure of a process chamber in which an object of processing is vacuum treated,
wherein
the process chamber has n number of exhaust paths (where n is an integer of two or larger), one end of each of which is connected to the process chamber to vacuum the inside thereof,
wherein,
a control valve is provided individually on the other end of every exhaust paths of n number;
wherein
a controller is provided to control the control valve, a pressure detection means is provided to detect the inner pressure of the process chamber, the conductance of the exhaust paths connected to the process chamber is controlled in a multiple control manner;
wherein
the multi-mode-control method for controlling inner pressure of a process chamber is characterized in that each controller provided on every exhaust path has the same form in terms of the valve opening degree signal transmission and the controlling of the control valves, an arbitrary controller functions as a master controller that generates the valve opening degree signal for the process chamber on the basis of a pressure value detected by the pressure detection means, the other remaining controllers function as slave controllers that is controlled by the valve opening degree signal generated by and transmitted from the master controller, receiving via the sequential daisy-chain connection, a communication line is formed from the master controller down to the slave controllers located on the end, multiple combinations of the master controller and every slave controller is made settable, an operation mode is provided that allows manipulating the opening degree of n number of control valves, a selection means for selecting the operation mode is provided, one combination of the master controller and the slave controller is set for every selected operation mode, the valve opening degree signal of either the generated valve opening degree common signal or the generated valve opening degree individual signal is transmitted to the slave controller on the basis of the set operation mode.

Advantageous Effect of Invention

In one aspect of the present invention, multiple combinations of the master controller and every slave controller is made settable, an operation mode is provided that allows manipulating the opening degree of n number of control valves, a selection means for selecting the operation mode is provided, one combination of master controller and slave controller is set for every selected operation mode, and the valve opening degree signal of either the generated valve opening degree common signal or the generated valve opening degree individual signal is transmitted to the slave controller on the basis of the set operation mode.

Thereby, a configuration suitable for a multi-mode-control apparatus for inner pressure of a vacuum chamber or a configuration suitable for a multi-mode-control method for inner pressure of a vacuum chamber is provided. The provided configuration does not require interposing a network or other controlling device between the combination of the controller for controlling the master valve and the grouped controllers for controlling the slave valves and the configuration utilizes the relationship between the master device and the slave devices by simplifying the communication line. Further, the combination of the master valve and the slave valves is configured, not for performing a unified control but to respond to the demand on the size and the inside configuration of the processing apparatus, or customer's needs, allowing a prompt adaptation to variety of demands.

BRIEF DESCRIPTION OF DRAWINGS

FIG. 6 This is a diagram showing a function of each controller and execution of function selection.

MODES OF CARRYING OUT THE INVENTION

Figure 1:
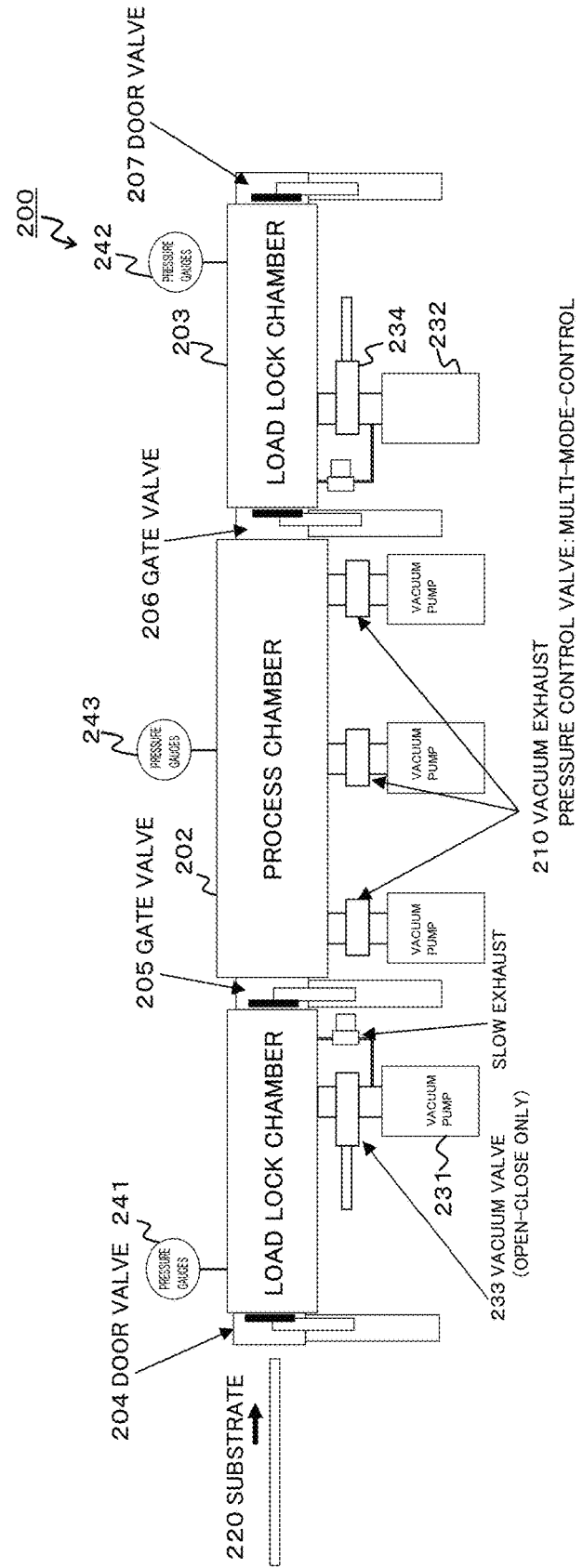
FIG. 1 This is a diagram showing a schematic configuration of a known general substrate processing system to which an embodiment of the present invention is applied.

FIG. 1 is a diagram showing a schematic configuration of a known general substrate processing system to which an embodiment of the present invention is applied.

FIG. 1 shows a known general substrate processing system 200 for processing a substrate 220 such as a semiconductor substrate or a liquid crystal substrate which is conveyed-in. The substrate processing system 200 includes, from the upstream side to the downstream side, a load lock chamber 201 on the upstream side, that is, before processing, a process chamber 202, and a load lock chamber 203 on the downstream side, that is, after the processing. At the entrance of the load lock chamber 201 on the upstream side, a door valve 204 is provided. Between the load lock chamber 201 on the upstream side and the process chamber 202, and between the process chamber 202 and the load lock chamber 203 on the downstream side, a gate valves 205 and 206 are provided. In the processing chamber 202, a plurality of pressure control valves 210 are provided, and, corresponding to the plurality of pressure control valve 210, a plurality of vacuum pumps 233 are provided.

Both the load chambers 201 and 203 have vacuum pumps 231 and 232, and the vacuum valves 233 and 234 are provided in combination with the vacuum pumps 231 and 232. The vacuum valves 233 and 234 are operated only for open and close. The door valves 204 and 207 can be handled as gate valves.

The load lock chambers 201 and 203, and the process chamber 202 are evacuated with the vacuum pumps 213, 232, and 233 for processing the substrate 220; and a predetermined processing is performed in each chamber. The pressure controlling inside the chamber is performed by controlling the pressure control valve 210.

Both the load lock chambers 201 and 203, and the process chamber 202 are equipped correspondingly with the pressure gauges 241, 242, and 243.

In the substrate processing system 200 shown in FIG. 1, the present invention relates to a multi-mode-control of a plurality of pressure control valves 210 provided on the process chamber 202 and to a multi-mode-control of a plurality of vacuum pumps 231 provided corresponding to the plurality of pressure control valves 210.

Figure 2:
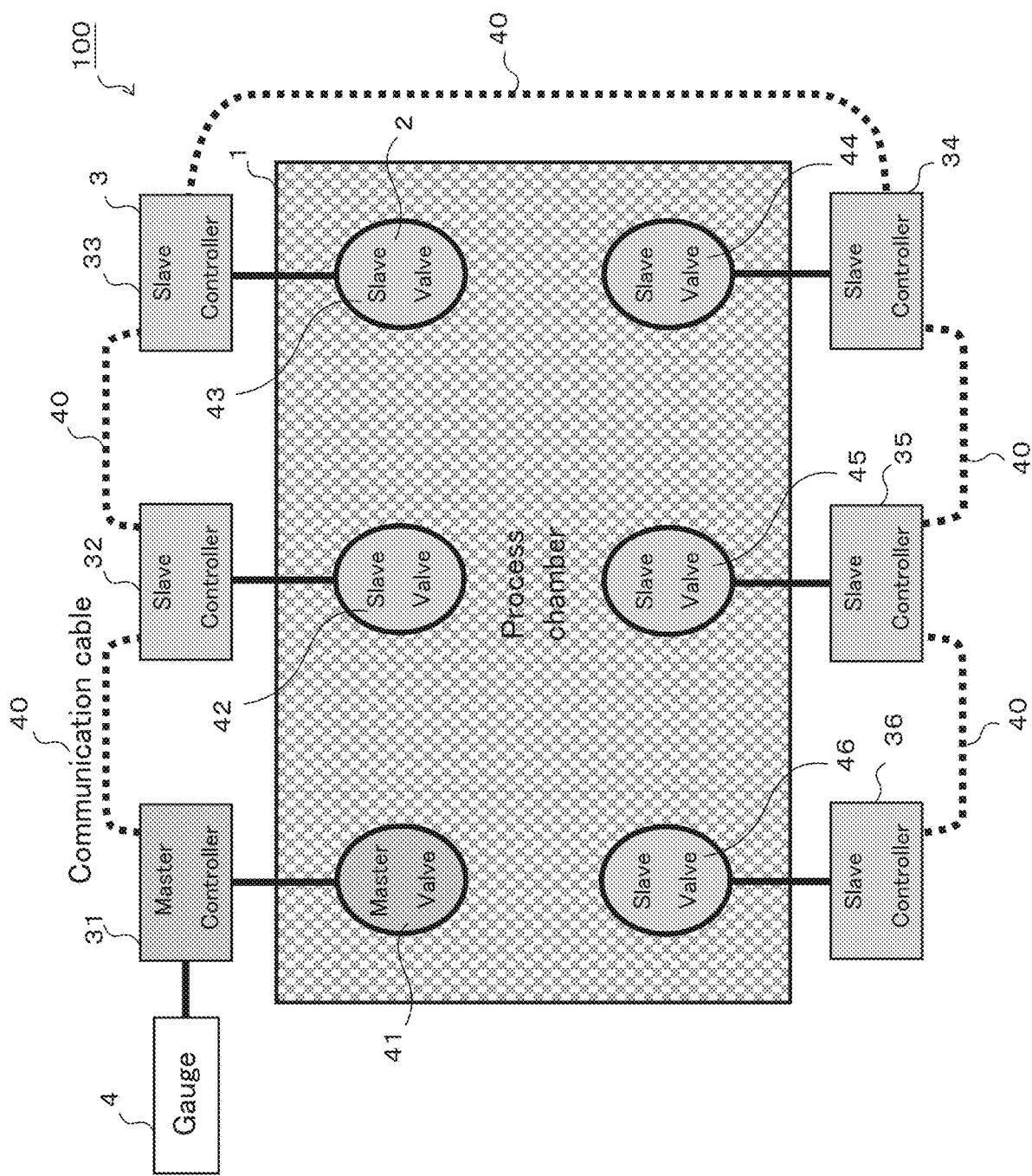
FIG. 2 This is a diagram showing a schematic configuration of an embodiment of the present invention.

As shown in FIG. 2, the multi-mode-control apparatus for inner pressure of the vacuum chamber 100 is provided, which performs the pressure control inside the process chamber in a multiple mode. In this example, the process chamber 202 in FIG. 1 is illustrated in FIG. 2 as a process chamber 1 as a vacuum chamber.

On the process chamber 1 as a vacuum chamber (corresponds to the process chamber 202 in FIG. 1), a multi-mode-control apparatus for inner pressure of a vacuum chamber is configured, wherein n number of the exhaust paths (where n is an integer of two or larger), one end of each path is connected to the process chamber 1 for evacuation of the inside of the process chamber, are provided; a control valve 2 (corresponds to the pressure control valve 210 in FIG. 1) is installed individually on every exhaust path and the control valve 2 is connected to the other end of each exhaust path; and a controller 3 that controls the control valve 2 is provided;

wherein the conductance of the exhaust path of the vacuum process chamber 1 provided with a gauge 4 as a pressure detection means for detection the inner pressure of the process chamber is controlled in a multi-mode-control manner. Hereinafter, when referring to the function of the control valve 2 provided on every exhaust passage, among control valves 2, a valve to be controlled by the master controller will be referred to as the master valve and those to be controlled by the slave controller will be referred to as the slave valves.

In the multi-mode-control apparatus for inner pressure of vacuum chamber 100, controllers 3 individually provided by one on every exhaust path have the same structural configuration, and their functions for the pressure control signal transmission (i.e., a valve opening degree signal transmission function) and their functions for the controlling the control valve 2 that controls the inner pressure of the process chamber are the same.

With this configuration, an arbitrary controller 3 functions as a master controller 31 to generate a pressure control signal, and all the other controllers 33, 34, 35, 36, - - - (N) function as slave controllers receiving the generated pressure control signal via a sequential daisy-chain connection.

The daisy-chain connection means a series connection of controllers 31, 32, 34, 35, 36, - - - , (N) by a communication line. The master controller 31 controls a master valve 41 by the generated pressure control signal, and the slave controllers 32, 33, 34, 35, 36, - - - , (N) slave valves 42, 43, 44, 45, 46, - - - , (N) respectively, by the generated pressure control signal.

Each one controller provided individually on every exhaust path has the same form in terms of the functions for transmission of the pressure control signal and in the control function for the control valve. The master controller 31 is connected to a Programmable Logic Controller (PLC) 50, and into which the pressure value detected by the pressure detection means and the target value of the inner pressure of the processing container are input. A communication line is formed from the master controller down to the slave controller located on the end. An upper controller to which the master controller 31 is connected is not limited to a PLC but other controllers and the like may be used in some cases.

In this configuration example therefore, the controller with the numeral 31 functions as a master controller. However, any one of controllers indicated with numerals 32, 33, 34, 35, 36, - - - , (N) may be used as the master controller, assigning the other controller as slave controllers.

Figure 3:
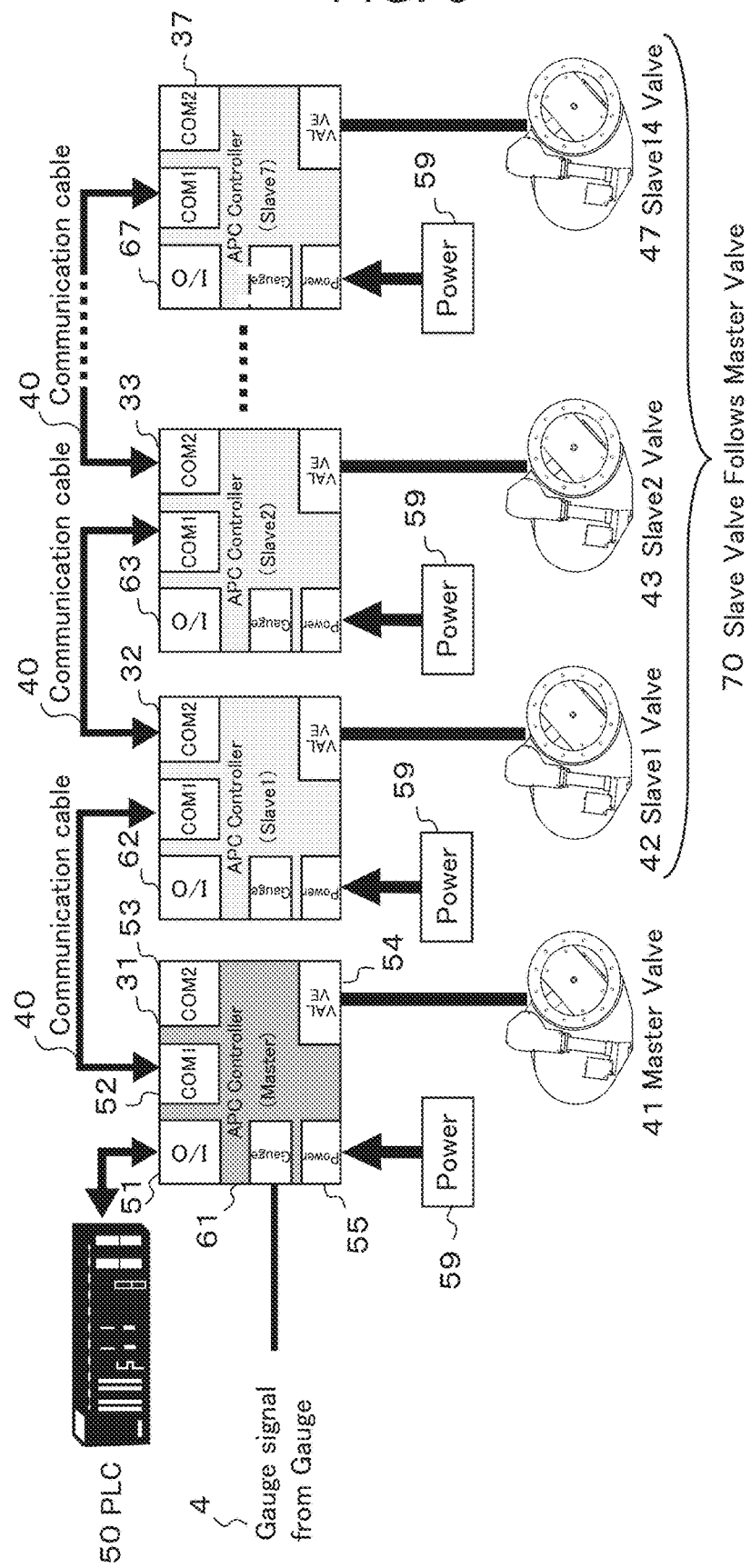
FIG. 3 This is a diagram showing the concept shown in FIG. 2 in a more specific configuration.

FIG. 3 is a diagram showing the concept shown in FIG. 2 in a more specific configuration.

FIG. 3 illustrates controllers 31, 32, 33, . . . , 37 and the master valve 41 and slave valves 42, 43, . . . , 47. Though not shown in the figure, other than controllers 31, 32, 33, . . . , 37, controllers 34, 35, 36, . . . (N) are provided. Each controller as an APC controller has the same structural configuration. Further, the master valve 41 and slave valves 42, 43, . . . , 47 have the same structural configuration. As shown in FIG. 3, the controllers 31, 32, 33, 34, 35, 36, . . . , (N), the master valve 41, and the slave valves 42, 43, 44, 45, 46, . . . , (N) have the same structural configuration.

All the controllers are connected sequentially in a daisy-chain style, and n number of exhaust paths, each of which has one controller, are severally given an identification code to be individually identified and a group identification code when grouped.

The arbitrary controller functions as a master controller for generating a pressure control signal of the processing chamber on the basis of the pressure value detected by the pressure detection means, and other controllers function as slave controllers to which the pressure control signal generated by the master controller is transmitted via the sequential daisy-chain connection.

The communication line is formed from the master controller down to the slave controller located on the end. The generated pressure control signal is transmitted down to the slave controller located on the end of the communication line.

In FIG. 3, the master controller 31 is shown as the APC controller (Master); likewise, the slave controllers 32, 33, and 37 are referred to as the APC controller (Slave 1), the APC controller (Slave 2), the APC controller (Slave 7), and so on. Thus, it is shown that each controller can be controlled in a unified manner by the pressure control signal generated by the master controller.

As shown in FIG. 3, each of controllers 31, 32, 33, 34, 35, 36, . . . , (N) has an I/O (51) which is an access port connectable to the PLC 50, a COM1 (52), a COM2 (52), and a COM2 (53); a VALVE 54 which is a connecting port connectable to the control valve 2; and a Power 55 which is a connecting port connectable to the power supply. These components are formed on substrates 61, 62, 63, . . . , (M). Further, Gauges that are connecting ports connectable to the Gauge 4 are formed on substrates 61, 62, 63, - - - , (M).

The substrates 61, 62, 63, . . . , (M) comprising those components: the I/O (51), COM1 (52), and COM1 (53); the VALVE 54; the Power 55 that are the connecting ports; and either one of the Gauge connecting ports 71, 72, 73, . . . , (M'), are constructed to have the same structure and form, and which substrate is to be the slave controller is arbitrary.

In this example, only the Gauge 71 provided on the substrate 61 of the master controller 31 is used.

A power supply 59 is connected to each of Powers 55. The exhaust path can be connected up to a maximum of 15, and the control valve 2 is installed on each exhaust path, and up to a maximum of 14 slave controllers 3 are juxtaposed. Maximum 15 units including the master controller are connected in a daisy-chain style.

Arbitrary controller, adapted to function as a master controller, takes in necessary data from the PLC, and generates the pressure control signal for controlling the slave controller. For this reason, each controller has sufficient processing capability to generate a pressure control signal. The computed and generated pressure control signal is transmitted from the master controller to the slave controller via the sequential daisy-chain connection over the communication line 40, and then the degree of opening of each control valve is set. The communication line 40 transmits signals bidirectionally as indicated with arrows in the figure.

A typical signal of the generated pressure control signal is the valve opening degree signal. Therefore, the master controller computes the opening degree of each valve. The calculated data of the valve opening degree signal is transmitted to the slave controllers via the communication line 40 as the generated pressure control signal. When viewed from the slave controller, this means that the pressure control signals generated by the master controller are sequentially transmitted. The pressure control signal can be replaced with the valve opening degree signal, which has an equivalent signal nature. Hereinafter, the explanation will be made using the valve opening degree signal. When viewed from the slave controller, it therefore means that valve opening degree signals generated by the master controller are sequentially transmitted.

The Gauge 4 detects the state of the pressure inside the process chamber, and the detection data is input in the master controller 31 to be used for processing.

As described above, the multi-mode-control apparatus for inner pressure of the vacuum chamber includes the PLC 50, wherein the PLC 50 makes the arbitrary controller connected to the PLC 50 to function as the master controller in accordance with the input command, and the other controllers are made to function as slave controllers, to which the generated pressure control signal is transmitted from the master controller via the sequential daisy-chain connection.

In the viewpoint from operation, it can be said that the slave valves are following the Master valve, (70).

The method for control from the PLC 50 is implemented, using RS-322 command, corresponding to linear control with analog DC input-output and to input-output with Hi-Lo signal.

Figure 4:
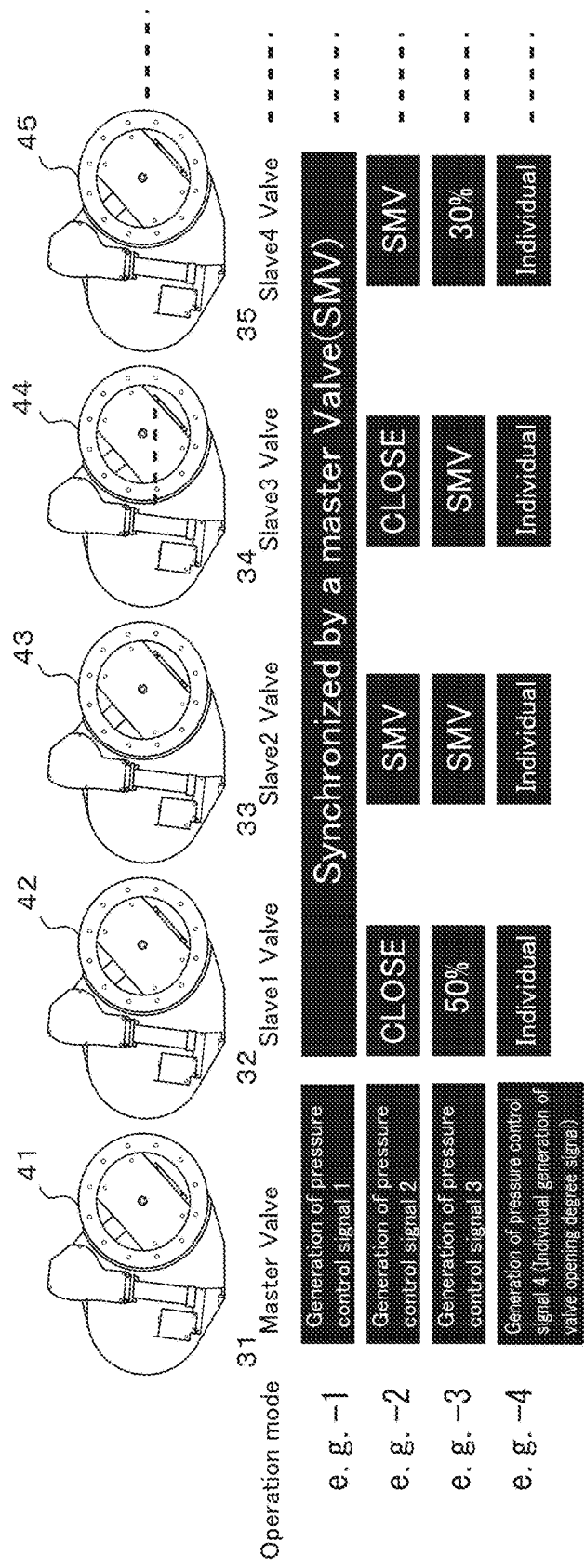
FIG. 4 This is a diagram showing a multi-mode-control in a vacuum chamber inner pressure multi-mode-control apparatus in an operation mode.

FIG. 4 is a diagram showing the operation mode of the multi-mode-control apparatus for inner pressure of the vacuum chamber. As a plurality of operation modes is settable, various multi-mode-control can be performed.

FIG. 4 shows a state in which e.g.-1, e.g.-2, e.g.-3, and e.g.-4 have been set as the operation mode. The setting is not limited to the shown four modes of e.g.-1, e.g.-2, e.g.-3, and e.g.-4.

When the operation mode is e.g.-1, the master controller 31 having a master function generates the valve opening degree signal, and issues the generated valve opening degree signal command. This command is sequentially transmitted to the slave controllers 32, 33, 34, 35, - - - (N) via the communication line 40.

The slave controllers 32, 33, 34, 35, - - - , (N), which have received the command of the generated pressure control signal, receive the control signal almost in synchronization with the master controller 31, and are able to transmit almost in synchronization with that reception the command of the generated valve opening degree signal to the adjacent controller. This aspect is expressed as being synchronized by a master valve (SMV). The master controller 31 and slave controllers 32, 33, 34, 35, . . . , (N) drive each control valve to the opening degree setting position on the basis of the pressure control signal, which is the opening degree command generated by and received from the master controller 31.

The time difference between the operation of the master valve by the master controller 31 and the operation of the slave valve by the slave controllers 32, 33, 34, 35, . . . , (N) is as extremely small as 50 ms or less, usually within 20 ms. It is therefore expressed here as synchronous control (SMV). Therefore, in this embodiment, the synchronous control means that the operation is controlled within an ordinary very small timing difference.

Using one master controller 31 and 14 units of slave controllers 32, 33, 34, 35, . . . , (N), as the maximum number of 15 devices, for one process chamber 1 of large capacity, the synchronized control of the opening degree position control and the pressure control is achieved.

The operation mode e.g.-2 and the operation mode e.g.-3 indicate modes where only the arbitrary slave valve undergoes the opening degree position control to be at the position of the arbitrary valve opening degree demanded by the dedicated Hold Command.

The operation mode e.g.-2 exhibits a case where the slave valve 42 undergoes the individual-close control, the slave valve 43 SMV, the slave valve 44 the individual-close control, and the slave valve 45 SMV control.

The operation mode e.g.-3 exhibits a case where the slave valve 42 undergoes the individual opening degree position control with 50%-open, the salve valve 43 SMV, the slave valve 44 SMV, and the slave valve 45 the individual opening degree position control with 30%-open. Which slave valve is to undergo SVM, the individual opening control with 50%-open, or the individual opening degree position control with 30%-open is determined in accordance with the characteristics of the process chamber or the needs of the user.

The operation mode e.g.-4 exhibits a mode where all the slave valves are separated by inputting the dedicated Hold Command and thereby the valve opening degree position is controlled to the arbitrary valve opening degree position.

In the operation mode e.g.-4, the master valve 41, the slave valve 42, the slave valve 43, the slave valve 44, and the slave valve 45 are controlled by the individually generated valve opening degree signal.

With the present embodiment, it is possible to operate individually each slave valve.

The process chamber has individuality in the configuration and arrangement of its internal devices, and therefore an individual control in accordance with their particularity is required for controlling the inner pressure. By knowing the individuality of each process chamber in advance, a control method suitable to the individuality is employed. Since the multi-mode-control apparatus for inner pressure of vacuum chamber or the multi-mode-control method for inner pressure of vacuum chamber has a selection means for selecting the operation mode, configuring them becomes practicable by identifying the valve opening degree signal for controlling the slave controller as the generated valve opening degree common signal or as the generated valve opening degree individual signal.

In FIG. 4, the operation modes are shown from the operation mode e.g.-1 to the operation mode e.g.-4. The operation mode e.g.-2 and the operation mode e.g.-3 however can be appropriately modified.

The multi-mode-control apparatus for inner pressure of vacuum chamber or the multi-mode-control method for inner pressure of vacuum chamber makes it possible to transmit the pressure control signal from the master controller to slave controllers as signals of both the generated valve opening degree common signal and the generated valve opening degree individual signal. The master controller controls a valve opening degree signal of the pressure control signal comprising either the generated valve opening degree common signal or the generated valve opening degree individual signal.

Figure 5:
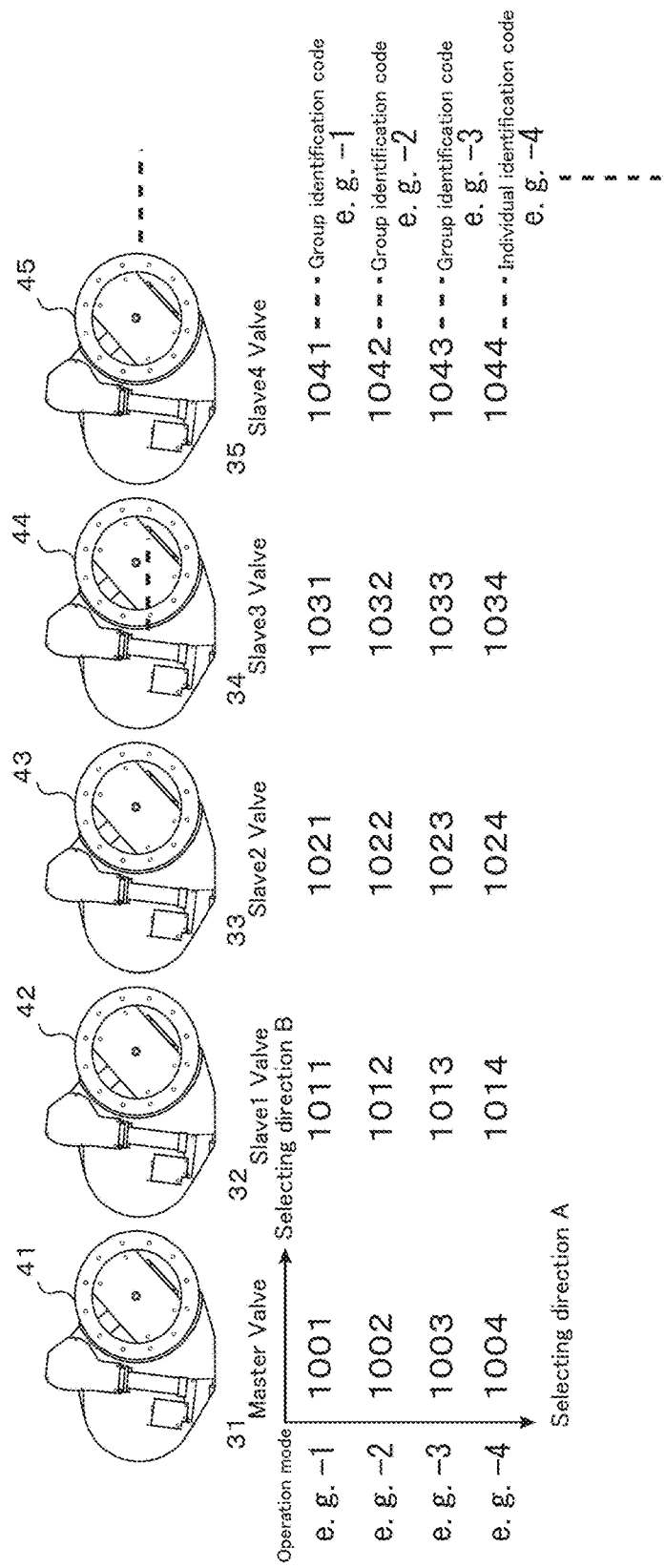
FIG. 5 This is a diagram showing an example in which an identification code is assigned to a master valve and slave valves so that the identification code can be selected in accordance with an operation mode.

FIG. 5 is a figure to describe an example in which the master valve and the slave valves are given identification codes to permit choosing identification code corresponding to the operation mode.

In order to simplify which operation mode is adopted, by storing these operation modes in the PLC, individual identification codes and group identification codes when grouped may be given to the slave valve 44 and the slave valve 45 in accordance with the operation mode. In the cases of the operation modes from e.g.-1 to e.g.-3, the group identification code is given, and in the case of the operation mode e.g.-4, the individual identification code is assigned. By setting the codes in this way, it becomes possible to freely select the selection direction A and the selection direction B and to set the operation mode. The way of setting the identification codes is however not limited to the above-stated method.

FIG. 6 is a diagram showing the function of each controller and doing the function selection.

As stated above, each controller 3 provided on every exhaust path has the same form in terms of the function for transmission of the valve opening degree signal and the control function of the control valve 2 that controls the inner pressure of the process chamber. These functions are automatically selected corresponding to the operation mode, and various controls shown in FIG. 4 are performed.

In the cases of the operation mode from the operation mode e.g.-1 to the operation mode e.g.-3, the valve opening degree signal from the master controller 31 is sequentially transmitted via the daisy-chain connection by the valve opening degree signal transmission function.

Also, in the cases of the operation mode e.g.-2 and the operation mode e.g.-3, the valve opening degree signal transmission function sequentially transmits the valve opening degree signal from the master controller 31 via the daisy-chain connection. In these cases, the scheme of controlling the slave valves is respectively set in accordance with the operation mode. Similarly, in the operation mode e.g.-4, the valve opening degree signal generated from the master controller 31 is sequentially transmitted via the daisy-chain connection by the valve opening degree signal transmission function; the valve opening degree signal however is not acquired but the control is performed in the operation mode in accordance with the generated and transmitted individual valve opening degree signal.

The controllers are connected sequentially in a daisy-chain style and the n number of the exhaust paths each having one controller are given individual identification codes to be individually identified and a group identification code when grouped, the operation mode is set on n number of the exhaust paths, the individual identification code and the group identification code assigned to each of the controllers on each of the n number of exhaust paths are selected and identified in accordance with the operation mode, and the control valves can be controlled by the respective controllers.

In this figure, it is described that all the slave valves are daisy-chain connected, but it may be practicable to configure making some slave valves operable independently without connecting to such daisy-chain. In such case of configuration, the present embodiment relates to a control scheme wherein a plurality of controllers are connected in daisy-chain style.

As stated above, the arbitrary controller is connected to the upper PLC which generates the pressure control signal for the process chamber on the basis of the pressure value detected with the pressure detection means, and such arbitrary controller connected to the upper PLC functions as the master controller. The valve opening degree signal is transmitted from the master controller to the remaining other controllers via the sequential daisy-chain connection, which other controllers function as slave controllers for follow-transmission of the valve opening degree signal, wherein, in the mode in which the all-group-identification codes assigned in grouping the n number of exhaust paths each severally having one controller are selected, all the slave controllers are controlled with the generated valve opening degree signal transmitted from the master controller via the sequential daisy-chain connection;

in the mode in which the group identification code assigned in grouping the n number of exhaust paths each severally having one controller is selected, the selected slave controller is controlled with the valve opening degree signal generated by and transmitted from the master controller via the sequential daisy-chain connection; and in the mode in which the individual identification code assigned in grouping is selected, all the controllers are individually controlled by the valve opening degree signals respectively generated.

There provided the PLC and the arbitrary controller to which the PLC is connected, and the PLC makes the connected controller function as the master controller and further makes other controllers function as the slave controllers.

It is possible to set a plurality of operation modes and to set a plurality of schemes of combination of the master controller and slave controllers in accordance with that set operation modes.

Thus, the multi-mode-control method for inner pressure of the vacuum chamber is configured, which includes such aspect that the operation mode is set on the combination of controllers provided on the n number of exhaust paths on the basis of the input operation signal, and each controller controls the control valve corresponding to the set operation mode.

According to the present embodiment, the following configuration is provided.

Each of the controllers provided on every exhaust path has the same form in terms of the transmission of the valve opening degree signal and the control function of the control valve.

Controllers are connected in a sequential daisy-chain style, and each of n number of the exhaust paths is provided with one controller and is given an individual identification code to be individually identified and a group identification code when grouped.

Arbitrary controller functions as the master controller that generates the valve opening degree signal of the vacuum chamber on the basis of the pressure value detected by the pressure detection means, and other controllers function as slave controllers to which the generated valve opening degree signal is transmitted from the master controller via the sequential daisy-chain connection, wherein the communication line is formed from the master controller down to the slave controller located on the end.

In the mode in which the group identification code assigned in grouping the n number of exhaust paths each having one controller is selected, all the slave controllers are controlled by the valve opening degree signal generated by and transmitted from the master controller via the sequential daisy-chain connection.

In the mode in which the group-identification codes assigned in grouping the n number of exhaust paths each having one controller are selected, the slave controller in the selected group is controlled by the generated valve opening degree signal generated by and transmitted from the master controller via the sequential daisy-chain connection, and the slave controller in the selected other group is individually controlled with the generated valve opening degree individual signal generated by and transmitted from the master controller via the sequential daisy-chain connection.

In the mode in which the individual identification code assigned, in grouping case, is selected, all the slave controllers are individually controlled by the valve opening degree signals respectively generated by and transmitted from the master controller via the sequential daisy-chain connection.

In addition, the multi-mode-control apparatus for inner pressure of vacuum chamber or the multi-mode-control method for inner pressure of vacuum chamber described below is configured.

The master controller generates a pressure control signal which is commonly transmitted to all the slaves or grouped controllers, and the valve opening degree signal which is transmitted individually to all the slave or grouped controllers. The slave controller is controlled by a valve opening degree signal of the pressure control signal comprising either the generated valve opening degree common signal or the generated valve opening degree individual signal.

A plurality of combinations can be set between the master controller and all the slave controllers.

An operation mode for operating the opening degree of the n number of control valves is provided, and selection means for selecting the operation mode is provided. One combination of the master controller and the slave controller is set for every selected operation mode, and either the generated valve opening degree common signal or the generated valve opening degree individual signal is transmitted to the slave controller on the basis of the selected operation mode.

According to the present embodiment, it is made possible to set a plurality of combinations between the master controller and all the slave controllers.

An operation mode for operating the opening degree of the n number of control valves is provided, and selection means for selecting the operation mode is provided. One combination of the master controller and the slave controller is set for each selected operation mode, and either the generated valve opening degree common signal or the generated valve opening degree individual signal can be transmitted to the slave controller on the basis of the selected operation mode.

Thereby, a configuration suitable for a multi-mode-control apparatus for inner pressure of a vacuum chamber or suitable for a multi-mode-control method for inner pressure of a vacuum chamber is provided. The provided configuration does not require interposing a network or other controlling device between the combination of the controller for controlling the master valve and the group of controllers for controlling the slave valves and the configuration utilizes the relationship between the master device and the slave devices by simplifying the communication line. Further, the combination of the master valve and the slave valves is configured, not for performing a unified control but to respond to the demand on the size and the inside configuration of the processing apparatus, or customer's needs, allowing a prompt adaptation to variety of demands.

REFERENCE SIGNS LIST

| | |
|---|---|
| 1 | Process chamber |
| 2 | Control valve |
| 3 | Controller |
| 4 | Gauge |
| 31 | Master controller (APC controller, master) |
| 32, 33, 34, 35, 36 | Slave controllers (APC controller, slave) |
| 40 | Communication line |
| 41 | Master valve |
| 42, 43, 44, 45, 46 | Slave valves |
| 50 | Programmable logic controller (PLC) |
| 51 | I/O port connectable to PLC 50 |
| 52 | COM1 |
| 53 | COM2 |
| 54 | Valve port connectable to control valve 2 |
| 55 | Power port connectable to power supply |
| 61, 62, 63 | Substrates |
| 70 | Following form |
| 71, 72, 73, - - -, (M) | Gauge connection ports |
| 100 | Multi-mode-control apparatus for inner pressure of vacuum chamber |

The invention claimed is:

1. A multi-mode-control apparatus for inner pressure of a process chamber in which an object of processing is vacuum treated,
wherein
the process chamber has n number of exhaust paths (where n is an integer of two or larger), one end of each of which is connected to the process chamber to vacuum the inside thereof, a control valve is provided individually on the other end of every exhaust paths of n number, a controller is provided to control the control valve, a pressure detection means is provided to detect the inner pressure of the process chamber, the conductance of the exhaust paths connected to the process chamber is controlled in a multiple control manner;
wherein
the multi-mode-control apparatus for inner pressure of the process chamber is characterized in that each one controller provided on every exhaust path has the same form in terms of the function for transmission of the valve opening degree signal and the control function of the control valves, the controllers are connected in a sequential daisy-chain style, an individual identification code for identifying each controller and a group identification code for identifying each group are assigned to each of the exhaust paths of n number, each of which severally has one controller, an arbitrary controller functions as a master controller that generates the valve opening degree signal for the process chamber on the basis of a pressure value detected by the pressure detection means, the other controllers function as slave controllers which receive, via the sequential daisy-chain connection, the valve opening degree signal generated by the master controller, a communication line is formed from the master controller down to the slave controller located on the end,
in the mode in which the all-group-identification code assigned in grouping the n number of exhaust paths each severally having one controller are selected, all the slave controllers are controlled by the generated valve opening degree signal transmitted from the master controller via the sequential daisy-chain connection,
in the mode in which the group identification code assigned in grouping the n number of exhaust paths each severally having one controller is selected, the slave controller in the selected group is controlled by the valve opening degree signal generated by and transmitted from the master controller via the sequential daisy-chain connection, and the slave controllers in the group other than the selected group are individually controlled by the respectively generated valve opening degree individual signals transmitted from the master controller via the sequential daisy-chain connections,
in the mode in which the individual identification code assigned in grouping is selected, every slave controller is individually controlled by the valve opening degree individual signals respectively generated by and transmitted from the master controller via the sequential daisy-chain connection.

2. A multi-mode-control apparatus for inner pressure of a process chamber in which an object of processing is vacuum treated,
wherein
the process chamber has n number of exhaust paths (where n is an integer of two or larger), one end of each of which is connected to the process chamber to vacuum the inside thereof, a control valve is provided individually on the other end of every exhaust paths of n number, a controller is provided to control the control valve, a pressure detection means is provided to detect the inner pressure of the process chamber, the conductance of the exhaust paths connected to the process chamber is controlled in a multiple control manner;
wherein
the multi-mode-control apparatus for inner pressure of a process chamber is characterized in that each controller provided on every exhaust path has the same form in terms of the valve opening degree signal transmission function and the controlling function of the control valves, an arbitrary controller functions as a master controller that generates the pressure control signal for the process chamber on the basis of a pressure value detected by the pressure detection means, the other controllers function as slave controllers which receives, via a sequential daisy-chain connection, the valve opening degree signal generated by the master controller, a communication line is formed from the master controller down to the slave controllers located on the end, the master controller generates the valve opening degree common signal that is to be transmitted commonly to controllers of all the slaves or to the grouped controllers and generates the valve opening degree signal to be transmitted individually to controllers of all the slave controllers or to the grouped controllers, and the slave controller is controlled by a valve opening degree signal comprising either the generated valve opening degree common signal or the generated valve opening degree individual signal.

3. A multi-mode-control method for inner pressure of a process chamber in which an object of processing is vacuum treated,
wherein
the process chamber has n number of exhaust paths (where n is an integer of two or larger), one end of each of which is connected to the process chamber to vacuum the inside thereof, a control valve is provided individually on the other end of every exhaust paths of n number, a controller is provided to control the control valve, a pressure detection means is provided to detect the inner pressure of the process chamber, the conductance of the exhaust paths connected to the process chamber is controlled in a multiple control manner;
wherein
the multi-mode-control method for controlling inner pressure of a process chamber is characterized in that each controller provided on every exhaust path has the same form in terms of the valve opening degree signal transmission and the controlling of the control valves, an arbitrary controller functions as a master controller that generates the valve opening degree signal for the process chamber on the basis of a pressure value detected by the pressure detection means, the other remaining controllers function as slave controllers that are controlled by the valve opening degree signal generated by and transmitted from the master controller, receiving via a sequential daisy-chain connection, a communication line is formed from the master controller down to the slave controller located on the end, multiple combinations of the master controller and every slave controller is made settable, an operation mode is provided that allows manipulating the opening degree of n number of control valves, a selection means for selecting the operation mode is provided, one combination of the master controller and the slave controller is set for every selected operation mode, the valve opening degree signal of either the generated valve opening degree common signal or the generated valve opening degree individual signal is transmitted to the slave controller on the basis of the set operation mode.

\* \* \* \* \*